United States Patent

Fulkerson et al.

[15] 3,645,744

[45] Feb. 29, 1972

[54] PHOTO- AND HEAT-SENSITIVE COMPOSITIONS

[72] Inventors: Brazelton Fulkerson; John W. Mench, both of Rochester, N.Y.

[73] Assignee: Eastman Kodak Company, Rochester, N.Y.

[22] Filed: Jan. 2, 1969

[21] Appl. No.: 788,650

[52] U.S. Cl. ......................................... 96/115, 96/85, 96/86

[51] Int. Cl. ....................... G03c 1/68, G03c 1/86, G03c 1/94

[58] Field of Search ....................................... 96/115, 85, 86

[56] References Cited

UNITED STATES PATENTS 3,514,442 5/1970 Fulkerson et al. ..................... 260/214

*Primary Examiner*—Norman G. Torchin
*Assistant Examiner*—Edward C. Kimlin
*Attorney*—Walter O. Hodsdon, Paul R. Holmes and John T. Lewis

[57] ABSTRACT

It has been discovered that coatings of cellulose propionate 3-morpholinobutyrate are sensitive to heat and light, such sensitive being illustrated by the insolubilization of the polymer that occurs upon exposure to such energy. Such coatings are useful as radiation-sensitive photoresists.

4 Claims, No Drawings

PHOTO- AND HEAT-SENSITIVE COMPOSITIONS

This invention relates to the use of cellulose propionate 3-morpholinobutyrate as a radiation-sensitive photoresist coating, and to special compositions useful in the preparation of such coatings.

It is well known in the art of photomechanical reproduction to use various materials such as bichromated shellac, albumin, polyvinyl alcohol, cinnamal ketone, polyvinyl cinnamate and the like for forming resist images on various supports or substrates such as metal plates. These supports are then washed, etched or otherwise treated in the areas not covered by the resist image. The resulting plate can then, for example, be used in printing processes.

Methods of forming relief images on solid supports is disclosed in several U.S. patents including No. 1,965,710 No. 2,610,120 and No. 2,732,301. In some of these disclosures and in U.S. Pat. application Ser. No. 415,177, filed on Dec. 1, 1964, the use of organic sensitizers is also discussed at length.

It has now been discovered that certain of the cellulose propionate 3-morpholinobutyrates (which will hereinafter sometimes be referred to as "CPMB") are sensitive to light and/or heat. In addition, these materials are excellent film-formers from organic solvent dope systems. Hence, they are particularly valuable for use as radiation-sensitive photoresist coatings either alone, or in combination with organic photolytic sensitizers, or even with other radiation-sensitive polymeric materials. More specifically, the CPMB's that are useful in the practice of this invention are those that are readily soluble in common organic solvents such as acetone and ethyl alcohol, and which contain from about 20 to about 50 weight percent of morpholinobutyrate, from about 10 to about 33 weight percent propionyl and from about 0 to about 5.5 weight percent of hydroxyl. CPMB can be manufactured by conventional procedures involving (a) the preparation of cellulose propionate crotonate, (b) partial hydrolysis of this material if desired, and (c) thereafter reaction with morpholine, preferably in the presence of an acidic catalyst such as, for example, acetic acid (as described in U.S. Pat. application Ser. No. 653,645, filed July 17, 1967). It is also preferred that the CPMB be stabilized (against spontaneous degradation to which it is subject under certain conditions) by the incorporation (i.e., fairly uniform blending) thereinto of a small amount (for example, from about 0.05 to about 5 weight percent, based on the weight of CPMB) of an organic antioxidant such as butylated hydroxytoluene p-tertiary butylphenol, tertiary butyl hydroquinone, p-methoxyphenol and the like, in accordance with the teachings appearing in U.S. Pat. application Ser. No. 653,646, filed July 17, 1967.

Typical, nonlimiting examples of sensitizers that can be used effectively in conjunction with CPMB in the radiation-sensitive compositions of the present invention are all of those disclosed in U.S. Pat. No. 2,610,120, and 2-methylanthraquinone.

EXAMPLE 1

Cellulose propionate 3-morpholinobutyrate (CPMB) of 3.85 percent nitrogen (42.9 percent morpholinobutyryl) content, and containing 1 percent of butylated hydroxytoluene as a stabilizer is dissolved to make a 5 percent solution in methyl ethyl ketone and 5 percent (based on polymer weight) of 2-methylanthraquinone is added as a sensitizer. Some of this solution is poured onto a precleaned 4×6 inch piece of aluminum and flowed over the surface. The metal is then placed in a dark box where the excess solution is allowed to drain off one end of the plate. The plate is held at room temperature in the dark for 1 hour, then removed from the box and placed in contact with a test negative on Kodalith film. The aluminum plate and negative are sandwiched between ¼-inch glass plates and exposed to a General Electric type S–1 300-watt mercury vapor light at a distance of 5½ inches for 8 minutes. Some of the heat from the lamp is dissipated by blowing air over the glass during the exposure.

After exposure, the aluminum plate is removed from the glass carrier and the coated side developed by washing the surface for 1 minute with methyl ethyl ketone. At this time essentially all of the unexposed polymer coating is removed. The image formed by the insoluble polymer is clearly visible. After allowing the plate to dry in a 110° C. oven for 3 minutes and cooling to room temperature a rub-up ink is applied in a desensitizing etch solution.

The inked polymer image on the plate is found to be sharp and distinct and can be rubbed vigorously without noticeable deterioration of the image.

EXAMPLE 2

A small amount of the polymer solution from Example 1 is coated on glass, copper, stainless steel and paper. Exposures are made through a halftone negative and satisfactory well defined images are obtained on all materials tested when developed with methyl ethyl ketone. Images of the polymer material are resistant to acetone, methyl ethyl ketone, water and alcohols, but are swollen by dilute acids such as acetic, which cause the polymer to lose adhesion for the substrate and float off intact.

EXAMPLE 3

A small square of black anodized aluminum is coated with the polymer solution from Example 1 then cured in the dark at room temperature for 1 hour. This coated surface is placed in contact with a halftone negative and exposed under glass as in Example 1. After exposure the polymer is developed by spraying methyl ethyl ketone over the surface using a small spray powered with an aerosol propellant. After development and drying the image is visible on the aluminum. This is then treated by slowly pouring 10 percent potassium hydroxide over the surface five times. The black surface of the metal is dissolved and removed from areas where the polymer has been removed during development, but the black areas under the insolubilized polymer coating are not affected by the alkali treatment. A positive print on anodized aluminum is thus obtained from the halftone negative.

EXAMPLE 4

Small samples of a lithographic plate are coated with the polymer solution from Example 1 and cured in the dark. These samples, one at a time, are placed in contact with a sheet of paper containing printed letters in black, then are placed paper down on a hot plate at 300° F. These are heated for various times until an image can be developed by washing the aluminum with acetone. An image is obtained when the piece is heated for 1.5 minutes, although some of the polymeric coatings form a tan color during heating. The image obtained is dark in the same areas which are dark on the paper original.

Solutions (or "dopes") of (a) one or more of the valuable CPMB's set out above (b) in combination with at least one radiation sensitizer, all dissolved in an organic solvent (or mixture of organic solvents) at total solids levels within the range of from about 1 to about 35 weight percent (in which the weight ratio of sensitizer(s) to CPMB of from about 1 to about 10 constitute one of the preferred embodiments of the present invention. These solutions can readily be utilized in the creation of useful photoresist coatings by simply applying the solutions onto the surface of a substrate and permitting the solvent to evaporate therefrom (while protecting the coated article from light). Similarly, preferred photochemical resist compositions of this invention comprise the resulting coated article having at least one layer thereon which consists essentially of one or more of the CPMB's described above and at least one radiation sensitizer (to enhance the sensitivity of the CPMB to actinic-radiation when it is exposed).

The invention has been described in detail with particular reference to preferred embodiments thereof, but it will be understood that variations and modifications can be effected within the spirit and scope of the invention.

We claim:

1. A radiation-sensitive photoresist element comprising a solid substrate and a coating of cellulose propionate 3-morpholinobutyrate on said substrate.

2. A photochemical resist composition consisting essentially of cellulose propionate 3-morpholinobutyrate and at least one organic photolytic sensitizer dissolved in a solvent.

3. A photochemical resist composition as in claim 2, wherein said composition also contains an organic antioxidant.

4. A photochemical resist element comprising a solid substrate having a radiation-sensitive coating thereon; said coating consisting essentially of stabilized cellulose propionate 3-morpholinobutyrate and at least one organic photolytic sensitizer to enhance the sensitivity of said cellulose propionate 3-morpholinobutyrate to actinic radiation.

* * * * *